Nov. 20, 1923.
S. C. PRICE
1,474,554
MEASURING AND DISPENSING DEVICE FOR LIQUIDS
Filed Oct. 10, 1921    2 Sheets-Sheet 2
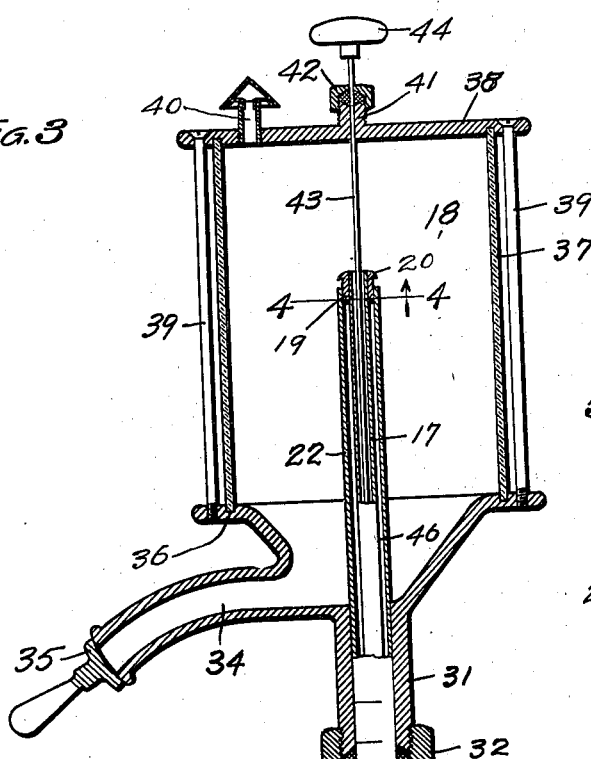
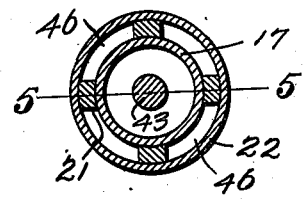
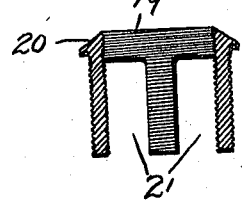
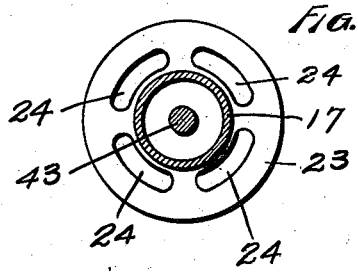
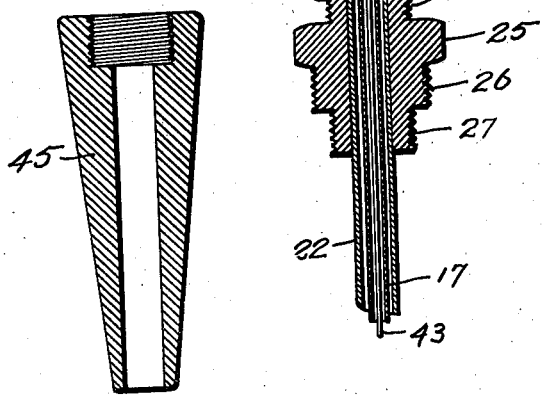
INVENTOR
STEPHEN C. PRICE
ATTY.

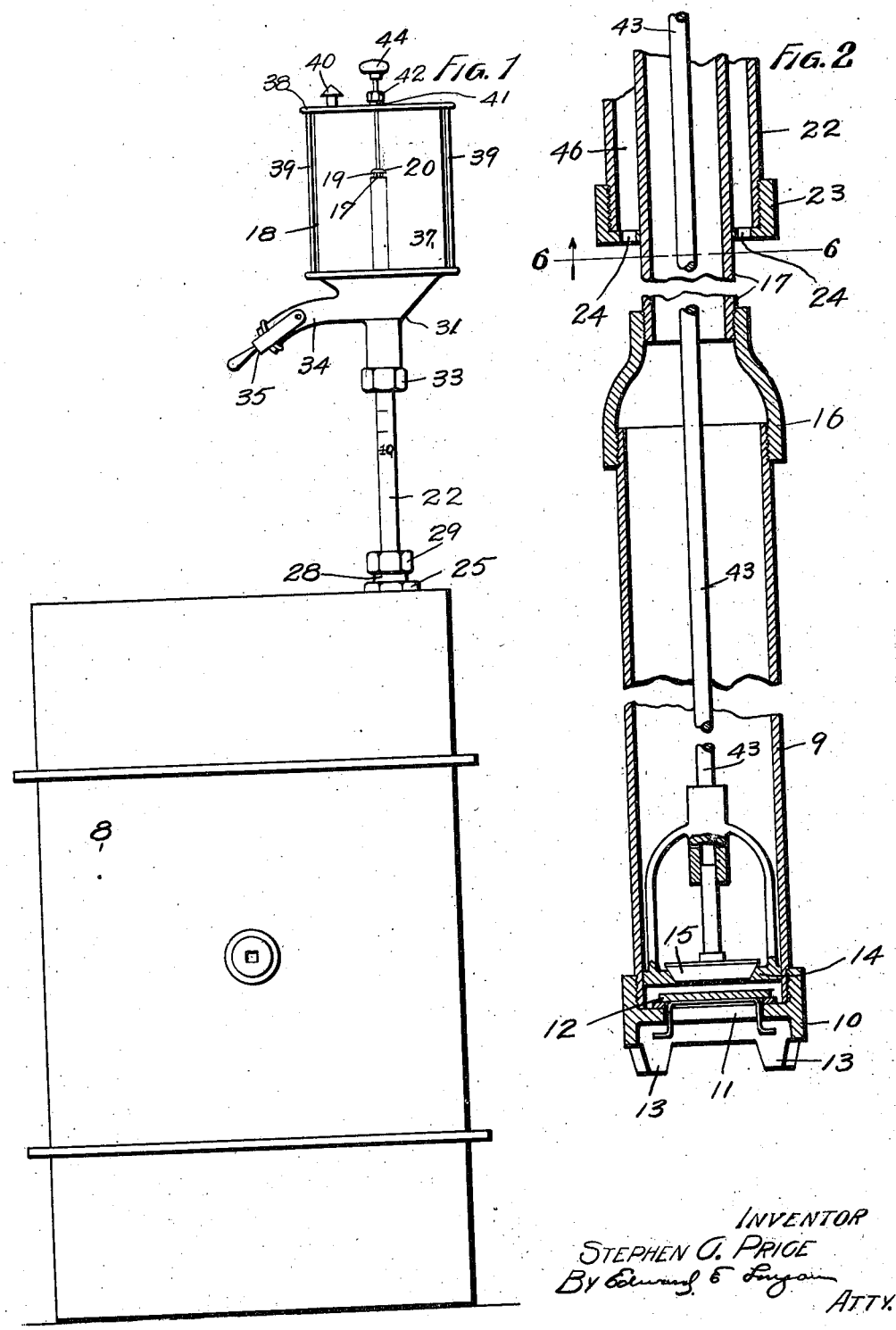

Patented Nov. 20, 1923.

1,474,554

UNITED STATES PATENT OFFICE.

STEPHEN C. PRICE, OF LOUISIANA, MISSOURI.

MEASURING AND DISPENSING DEVICE FOR LIQUIDS.

Application filed October 10, 1921. Serial No. 506,703.

*To all whom it may concern:*

Be it known that I, STEPHEN C. PRICE, a citizen of the United States, and resident of the city of Louisiana, county of Pike, and State of Missouri, have invented certain new and useful Improvements in Measuring and Dispensing Devices for Liquids, of which the following is a specification, containing a full, clear, and exact description, reference being had to the accompanying drawings, forming a part hereof.

My invention relates to improvements in measuring and dispensing devices for liquids, and has for its primary object a device which is attached to a drum or other liquid container, and which has a measuring and dispensing device secured thereto so that the liquid can be drawn into the measuring and dispensing container and drawn therefrom to be dispensed.

A further object is to construct a measuring and dispensing device for liquids having a dispensing container which is so constructed that only a predetermined amount of liquid can be placed therein, any surplus of liquid draining back into an ordinary container.

In the drawings,

Fig. 1 is a side elevation of my device attached to a drum.

Fig. 2 an enlarged fragmental section of the lower portion of my device.

Fig. 3 an enlarged fragmental section of the upper portion of my device.
Fig. 4 an enlarged cross section taken on the line 4—4 of Fig. 3.

Fig. 5 an enlarged cross section of the sleeve made use of in the upper portion of the pumping and draining tubes taken on the line 5—5 of Fig. 4.

Fig. 6 a cross sectional view taken on the line 6—6 of Fig. 2.

Fig. 7 a vertical sectional view of the plug made use of when it is intended to use my device in a wooden container.

In the construction of my device I employ a liquid container 8 which may be either a metal drum whose bunghole is provided with screw threads, or it may be a wooden package, such as a barrel provided with an ordinary bung to receive a stopper. Through the bunghole is placed a pumping device consisting of a pump cylinder 9 to the lower end of which is secured a valve housing 10.
This valve housing being provided with a central opening 11 which is adapted to be closed by means of a lifting valve 12. The lower end of the valve housing is provided with feet 13 which is for the purpose of permitting the liquid to pass underneath the housing 10. Within the pump cylinder 9 is located a pump plunger 14 having a valve 15. This valve is adapted to lift upwardly when the plunger descends and allow the oil to rise above it, and when lifted upward carries the oil with it; the weight of the oil closing the valve 14. To the upper end of the pump cylinder 9 is secured a reducing coupling 16 and to this coupling is secured a delivery pipe 17. This pipe extends upward into the dispensing chamber 18. To the upper end of the delivery pipe 17 is secured a sleeve 19. This sleeve is screwthreaded both internally and externally and is provided on its upper portion with a lip 20. The sleeve 19 is provided with openings 21 so that when the return or overflow pipe 22 is secured to the sleeve 19, openings will be left which will permit the oil to flow into the pipe 22. The lower end of the pipe 22 is provided with a cap 23. This cap is provided with a central opening through which the pipe 17 passes and with a plurality of drain openings 24. This lower portion of the pipe is adapted to be placed within the container 8 and allows the oil which overflows into the pipe 22 to return to the container. Slidably secured on the pipe 22 above the cap 23 is a bushing 25. This bushing is provided with screw-threaded extensions 26 and 27 so that it can be secured in different sized bung openings. The bushing 25 is provided with a wrench engaging surface, and above this wrench engaging surface is a packing gland 28 which receives the packing nut 29. This is for the purpose of securely holding the device within the container and prevents it being lifted when the pump is operated. This is accomplished by tightening the packing nut 29 which compresses the packing 30 and holds the pipe 22 by friction. The pipe 22 passes upward through the bottom 31 of the container 18. This bottom is provided with a packing gland over which the packing nut 32 is secured, and by means of the packing 33, the dispensing container 18 is held in any desired position on the pipe 22. The bottom 31 is also provided with a dispensing or pouring spout 34 which is closed by means of a valve 35. The bottom 31 is also provided with a circular groove 36 in which the lower end of a glass cylinder 37 is secured in such a manner as to make it leak-proof. Secured to the upper end of the glass cylinder in a similar manner is a top 38. The top 38, bottom 31, and cylinder 37 are secured together by means of screws or bolts 29 which prevent them from becoming separated or loosened. The top is also provided with an air vent 40 and with a gland 41 to which the packing nut 42 is secured. The purpose of this packing nut is to prevent leakage along the pump rod 43 which has secured to its upper end a knob or handle 44. The pipe 22 is provided with graduations and by loosening the packing nut 32 and adjusting the container 18 upward and downward on the pipe 22, the amount of liquid within the container 18 can be accurately determined.

In the event I desire to use my device on a wooden package, such as a barrel or a package which has a smooth bunghole, the tapered plug 45 is secured to the lower portion of the bushing 25.

The operation of my device is as follows:

The bushing 25 is first secured within the bunghole of the container, this is done by first inserting the pump cylinder 9 in the container. The packing nut 29 loosened, and the entire device pushed downward until the feet 13 rest upon the bottom of the container. The packing nut 29 is then tightened sufficiently to prevent any lifting up of the pump cylinder. The packing nut 32 then loosened and the device set for the desired quantity of liquid. For example— the device is set at one pint which is indicated by one of the graduations on the pipe 22. This graduation being at the bottom or underside of the packing nut 32. The packing nut 32 is then tightened and the handle 44 together with the pump rod 43 moved up and down. This will pump oil into the pipe 17 and its upper end being flush with the sleeve 19 will discharge the oil at that point and cause it to flow over the lip 20. When the oil has reached the level of the upper end of the pipe 22 it flows through the openings 21 into the space 46 formed between the pipes 17 and 22 and back into the container 24. Thus it will be seen that there is no chance to put more liquid in the container then is called for by graduation on the pipe 22. If desired I may also place an indicating gauge on the container 18, or I may secure a gauge within the container and extend it along the pipe 22. In this instance the gauge will be fastened either to the top or bottom of the container and moved therewith.

While I have shown an ordinary molasses gate valve, it is obvious that any kind of a valve can be used in the spout 34. Neither do I desire to limit myself to the precise construction of the means for lifting the liquid into the measuring and dispensing chamber as there are various methods by which this can be done, and by placing the graduations on the pipe 22 and adjusting the dispensing container upward and downward, it is possible to use a glass cylinder 37 which may have imperfections and bulges, and thus eliminate the cost of grinding inside of the glass cylinder to a certain size, as the container can be graduated after it has been assembled and placed on the pipe 22 by removing the air vent 40 and using standard measures to fill in liquid of a known quantity and graduate the pipe 22 accordingly.

Having fully described my invention, what I claim is:

1. A liquid dispensing and measuring device comprising a liquid container, a pipe projecting therein, a second pipe secured around the upper portion of said first mentioned pipe, and of larger diameter, its lower end opening into the liquid container, a dispensing and measuring chamber adjustably secured on the upper portion of said second mentioned pipe, a pumping device secured in the first mentioned pipe, said second mentioned pipe adapted to act as an overflow for the liquid in the dispensing and measuring chamber when a predetermined liquid level has been reached therein.

2. The device of claim 1 having the second mentioned pipe provided with a series of graduations for predetermining the level at which the overflow takes place.

In testimony whereof, I have signed my name to this specification.

STEPHEN C. PRICE.